(12) United States Patent
Walter et al.

(10) Patent No.: US 6,334,110 B1
(45) Date of Patent: Dec. 25, 2001

(54) SYSTEM AND METHOD FOR ANALYZING CUSTOMER TRANSACTIONS AND INTERACTIONS

(75) Inventors: Joanne S. Walter, Alpharetta, GA (US); David K. Schrader, Hermosa Beach, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/265,675

(22) Filed: Mar. 10, 1999

(51) Int. Cl.[7] .................................................... G06F 17/60
(52) U.S. Cl. .............................................................. 705/14
(58) Field of Search .................................. 705/8, 14, 26; 235/380, 493

(56) References Cited

U.S. PATENT DOCUMENTS

| | | | |
|---|---|---|---|
| 4,649,481 | 3/1987 | Takahashi | 364/405 |
| 5,305,196 | 4/1994 | Deaton et al. | 364/401 |
| 5,426,282 | 6/1995 | Humble | 235/383 |
| 5,481,094 | 1/1996 | Suda | 235/383 |
| 5,537,314 | 7/1996 | Kanter | 364/406 |
| 5,541,835 | 7/1996 | Dextraze et al. | 364/401 R |
| 5,634,101 | 5/1997 | Blau | 395/210 |
| 5,642,485 | 6/1997 | Deaton et al. | 395/214 |
| 5,687,322 | * 11/1997 | Deaton et al. | 705/14 |
| 5,933,811 | * 8/1999 | Angles et al. | 705/14 |
| 5,974,396 | * 10/1999 | Anderson et al. | 705/14 X |
| 6,129,274 | * 10/2000 | Suzuki | 235/381 |

FOREIGN PATENT DOCUMENTS

WO 98/56154 * 12/1998 (WO) ..................................... 705/14

OTHER PUBLICATIONS

Smart Marketing by Jennifer deJong, Computerworld, Feb. 7, 1994.*
Database Marketing by Mike Carr, Marketing Intelligence & Planning, 1994.*

* cited by examiner

Primary Examiner—Stephen Gravini
(74) Attorney, Agent, or Firm—Needle & Rosenberg, P.C.

(57) ABSTRACT

A system and method is provided for analyzing customer behavior based on the time when those behaviors occur. This invention captures information about customer transactions and interactions over time, classifies customers into one or more clusters based on their time-based interactions and transactions, or both, and uses this classification to perform selected target marketing and cross-selling. This is performed by temporally tagging customer transactions and interactions, analyzing the tagged information to create temporal profiles, creating advertising campaigns aimed at the temporal profiles, triggering an advertising campaign, and analyzing the effectiveness of the advertising campaign.

12 Claims, 11 Drawing Sheets

FIG. 4

Customer Behavior

Customer Name: Willard Wiggens  Customer ID: 34ZU6791

Behavior over Interval: 10/09/97 To 10/09/97  Very Active

Activities, By Date, By Channel:

| | | | |
|---|---|---|---|
| 10/09/97 05:00 | Web: | Browsed: | Sporting Goods | 21, 22, 59 |
| 10/09/97 05:21 | Web: | Browsed: | Baby Attire | 78, 79 |
| 10/09/97 05:26 | Web: | Bought: | Baby Attire | 78 |
| 10/09/97 18:10 | Store: | Bought: | Sporting Goods | 21 |
| 10/09/97 18:12 | Store: | Bought: | Groceries | 119, 120 |
| 10/09/97 22:10 | CallCtr: | Inquiry: | Sporting Goods | 22 |
| 10/09/97 22:15 | Web: | Bought: | Sporting Goods | 22 |

FIG. 5

Customer Profile

Customer Name: Willard Wiggens — 510    Customer ID: 34ZU6791 — 520

Profile Based on Behavior over Interval: 01/01/97 — 530    To  10/10/97 — 540

[3] Profiles (click on any underlined word for more detail)

Sports Enthusiast – Skier – Browses New Ski Equipment on the Web in October/November, buys in early December. Cross Sales of Ski Attire most probably in January. Organizes yearly ski trip for group in March. — 550

Family Food Shopper – Does weekly replenishment shopping on Wed. evenings; see Market Basket typical purchase set and Replenishment Periodicities. Impulse buyer on wekends. — 560

New Father – browses Children's Attire and Children's Toys during early morning hours; buys in Store. — 570

FIG. 6

Profile-Based Segmentation

Customer Name: Willard Wiggens — 610    Customer ID: 34ZU6791 — 620

Top 04 Matches On Weighted Profiles.    Total in Segment: 122

630 — 65% Sports Enthuasiast,    0% Family Food Shopper,    35% New Father
                                        650                              660

| Customer Name | Score | Sports Enthuasiast | New Father |
|---|---|---|---|
| Terry Ries | 92 | MB: 95  CH: 22 | MB: 90  CH: 89 |
| Marty Wade | 91 | MB: 92  CH: 90 | MB: 89  CH: 02 |
| Doug Albert | 89 | MB: 80  CH: 92 | MB: 99  CH: 89 |
| Joe Swope | 82 | MB: 77  CH: 92 | MB: 83  CH: 81 |

640

New Segment Name: Sports-Oriented New Fathers — 670

MB: Market Basket
CH: Channel

FIG. 8

Campaign Creation

Campaign: [ 10% off on Skier's Baby Carrier ] — 810

Mode:
| In Store Coupon | Web Applet | End of Aisle |
| Home Mailer | Telemarketing | Catalog Special |

— 820

Date: [ 07/01/97 ] To [ 09/30/97 ] — 840
       830

Where: [ East Region ] — 850

FIG. 10

Analyze Campaign Impact

Offer Name: [10% Off on Skier's Baby Carrier] —1010

Campaign Ran From: [07/01/97] To [09/30/97] —1030
                    1020—

Segment: [Sports – Oriented New Fathers]      Size: 122 —1045
                    1040—

Total Number of Offer Viewings..............................51
Total Number of Unique Viewings............................36
Number of Wins.............................................21
  Sales via Web...........................................14
  Sales via Store..........................................7 !!!
Campaign Effectivness Score..............................231 !!!

⎫
⎬ —1050
⎭

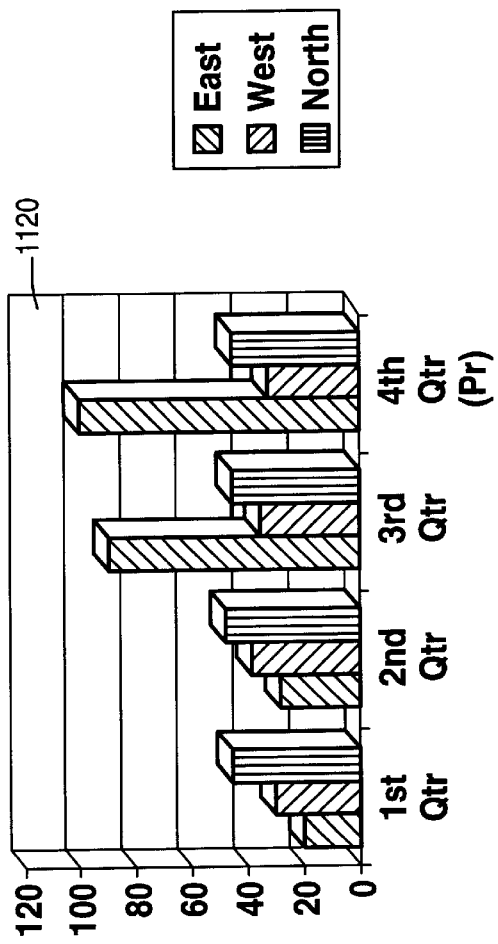

SYSTEM AND METHOD FOR ANALYZING CUSTOMER TRANSACTIONS AND INTERACTIONS

BACKGROUND OF THE INVENTION

1. Field of the Invention

The present invention generally relates to temporally defining virtual communities, and specifically to a system and method for analyzing customer transactions, such as purchases, in a commercial setting, as well as analyzing customer interactions, such as via browsing on the Internet

2. Description of the Prior Art

Presently, there exist systems that capture purchase transactions about customers. This information may be loaded into a scaleable data warehouse (SDW) for analysis by marketing personnel to determine product correlations, trends in sales, brand and color preferences, and trends in buying behavior based on demographics, psychographics, or geography. These systems may perform market basket analysis (products bought together at the same time), propensity analysis (buying product X predicts a subsequent purchase of product Y), or customer segmentation (defining a set of customers that buy or may buy a certain product or products).

These systems include the Knowledge Discovery Workbench available from NCR, the Management Discovery Tool available from NCR and the software available from Sterling Douglas which is used to create predictions of sales volumes.

SUMMARY OF THE INVENTION

The present invention addresses the need to temporally analyze customer transactions (i.e., purchases) and customer interactions (i.e., browsing on retail sites of the World Wide Web of the Internet). In other words, this invention analyzes customer behaviors based on the time when those behaviors occur. The invention captures information about customer interactions and transactions over time, classifies customers into one or more clusters based on their time-based interactions and transactions, or both, and uses this classification to perform selected target marketing or cross-selling.

Customer point of sale purchase information may be obtained by capturing point of sale scanner information. With the emergence of electronic commerce, it is also possible to collect customer purchase information and customer interaction behavior. In addition, the marketing analyst can examine differences in transaction behavior across in-store purchases and purchases on the Web (e.g., in-store and Web store "channels"). For example, some segments of customers may browse in the physical store and make a purchase through the Web store. Others may browse the Web store to gather product information, then only buy the product in the physical store. Some customer behavior may be product specific. For example, a customer may buy books through the Web, but purchase food items at a physical store.

The time when an item was purchased or browsed is important. Each purchase and browsed item may be tagged with the time it was bought or accessed. Temporal information on purchases or interactions may be captured when customers use scanners, Web browsers, kiosks, make calls to an inbound customer care center, or react to a call from an outbound customer care center. For Web browsers, by capturing keyclick information, it is possible to know what is browsed but not bought on the Web. This temporal browsing behavior, or interactions, resulting in no transaction is also useful to the marketing analyst because it reveals what customers considered but did not buy. Gathering the time an interaction took place may be useful in segmenting customers, because browsing time may be quite different from transaction time.

In-store temporal transaction information can be merged with Web temporal transaction information to provide a more complete report on customer behavior. Subsequent advertising or "segment-of-one" marketing campaigns can be built to target specific customers. With temporal profiling and temporal campaign management, marketing analysts can identify when people tend to be amenable to advertising. By building a profile of customer roles linked to time-of-day, day-of-week, and/or week-of-year, the marketing analyst can better predict when an advertising message might be most effective.

In summary, the following steps are performed. In step one, sources of information are temporally tagged by the customer "touchpoint", which in the preferred embodiment may be a scanner, a kiosk, a customer care center, or a web browser. However, this invention may use other sources as well and includes any point at which a customer interfaces with a business. This information is kept in a SDW database such as the Teradata database available from NCR.

In step two, temporally tagged transaction or browsing information is analyzed to create temporal profiles. These profiles are created one per customer, and represent a complex time series object that captures the sequence of browsing and buying activity as well as the timestamp of each activity and the product being browsed or bought.

Individual temporal profiles can then be clustered using traditional data mining methods to identify groups, or segments of customers with similar browsing or buying behaviors at particular points in time. These clusters are called "virtual communities of interest".

In step three, the marketing analyst then uses these segments to develop segment-specific advertising campaigns to appeal to these virtual communities of interest. Each temporal campaign involves an offer that will be made through one or more of the channels whenever the customer is identified through those channels and the profile indicates an opportunity for dynamic advertising. In this step, the marketing analyst decides which offers will be made to which communities of interest, through which channels, and when. This information is also kept in a database such as the Teradata database available from NCR.

Step four occurs when a customer who is a member of a particular virtual community of interest browses or buys at a specified time through a channel that can connect to the database. A check is made whether unique targeted advertising or offers are to be made to the customer. If so, the advertising information content is sent to the end user.

Step five involves the gathering of statistics over a period of time to determine the effectiveness of the advertising by channel. Temporal profiles that are successful are highlighted for reuse or further decomposition. Profiles which were not good predictors of subsequent buying behavior are discarded.

BRIEF DESCRIPTION OF THE DRAWINGS

FIG. 4 is a diagram illustrating a sample user interface display of customer behavior.

FIG. 5 is a diagram illustrating a sample user interface display of customer profile.

FIG. 6 is a diagram illustrating a sample user interface display of profile-based segmentation.

FIG. 8 is a diagram illustrating a sample user interface display of the creation of a campaign.

FIG. 10 is a diagram illustrating a sample user interface display of the analysis of the impact of a campaign.

FIG. 11 is a diagram illustrating a sample user interface display of the analysis of the impact of a campaign for profitability.

DETAILED DESCRIPTION OF THE INVENTION

A. Gathering Transactions and Interactions

Figure 1:
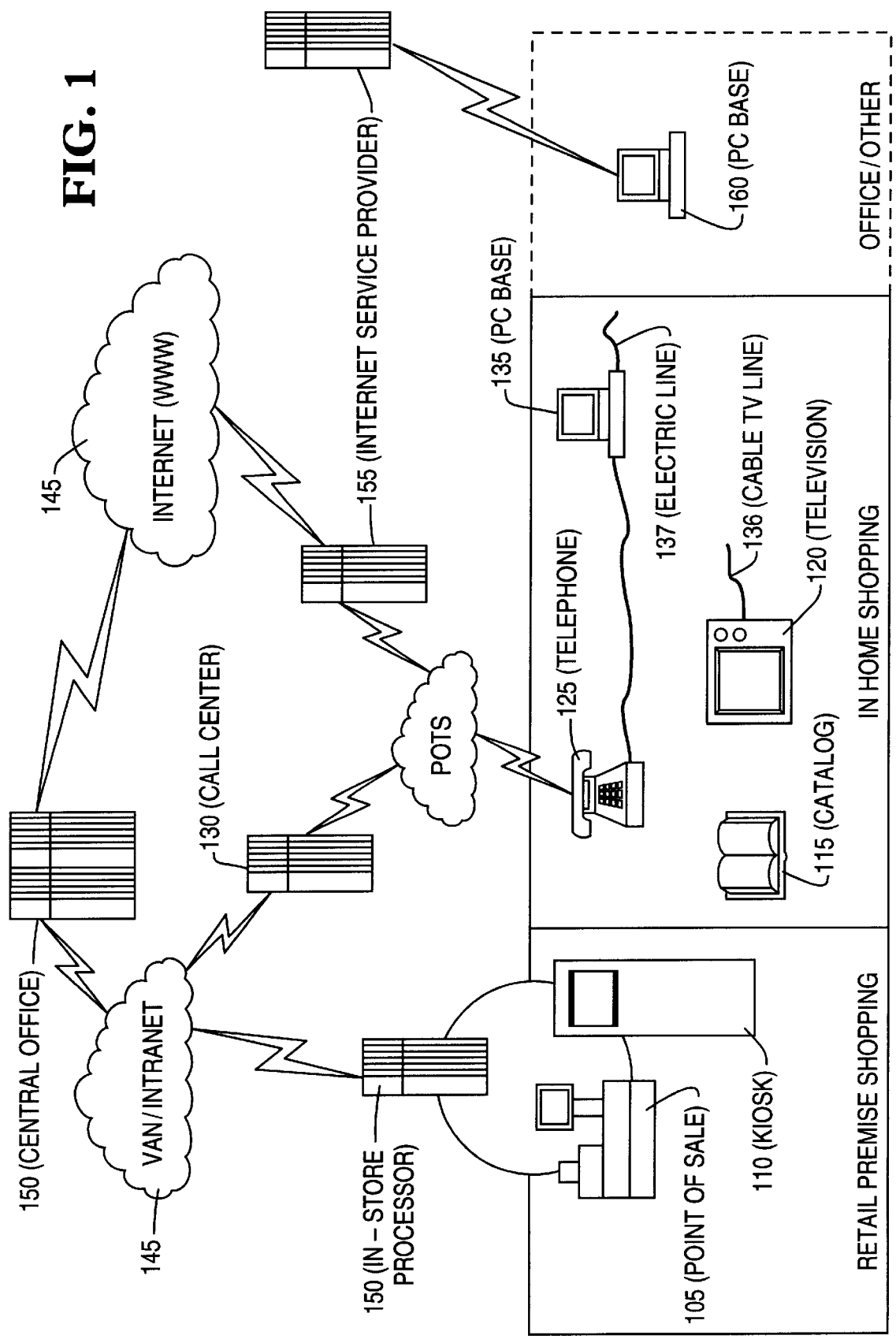
FIG. 1 is a diagram showing the overall building blocks for the invention, in one embodiment.

Referring to FIG. 1, time stamped transaction data is generated by a point-of-service device, which can exist in many forms. The traditional point-of-service is the cash register 105 found at a retail location which includes a scanner and a keyboard, etc. Scanners may include hand-held retail scanners such as NCR model numbers 7835, 7836, and 7890. Keyboards may include any retail keyboard. The point-of-service function could also be a kiosk 110.

In addition to these point-of-service locations, non-store retailing has developed other point-of-service devices. With catalog 115 and television 120 based home shopping, the phone 125 is the consumer's interface to the point-of-service call center 130 managed by a retailer. With the advent of commercial online services and the internet, a PC 135 may also serve as the point-of-service while online to the retail service. Other point-of-service connections may be between a PC 135 and cable TV line 136 or between PC 135 and an electric line 137.

In the case of the traditional cash register 105 and the kiosk 110, these systems are generally connected to an in-store processor 140 at the retail location. In the preferred embodiment, each transaction is tagged with the time it was made and the in-store processor 140 sends the information from multiple cash registers 105 to the central office 150. The in-store processor 140 consolidates information from multiple cash registers 105 and/or kiosk 110 and may provide a gateway to a wide area network 145. The key interface for this gateway is the retailer's central office 150. The consumer's interface and record of this transaction is typically the printed receipt from the cash register or kiosk. Consumers are typically not given a record of their interactions with the system, but these interactions are captured by the kiosk 110 and also sent to the in-store processor 140 and ultimately to the central office 150.

In the in-home shopping environment the consumer is provided some mechanism to browse products. Catalog retailing 115 provides the physical catalog that contains product information and pricing. TV based retailing 120 provides a broadcast of product information and pricing on which a consumer can make a purchase decision. In the case of PC based shopping 135 the consumer typically is provided an "electronic" catalog. Interfacing to the retailer is done through the use of an online service provider or through an Internet Service Provider 155.

In the case of catalog 115 and TV shopping 120 the consumer places a call most often to the retailer's call center 130. The call center 130 can tag the transaction with the time that it occurred. In the case of PC-based home shopping, both transaction and interaction data may be collected and time-stamped.

Transaction and interaction information may be gathered from several locations. In the preferred embodiment the main repository is the central office 150 with data feeds from the in-store processor 140, the call center 130 or by the internet service provider 155.

Figure 2:
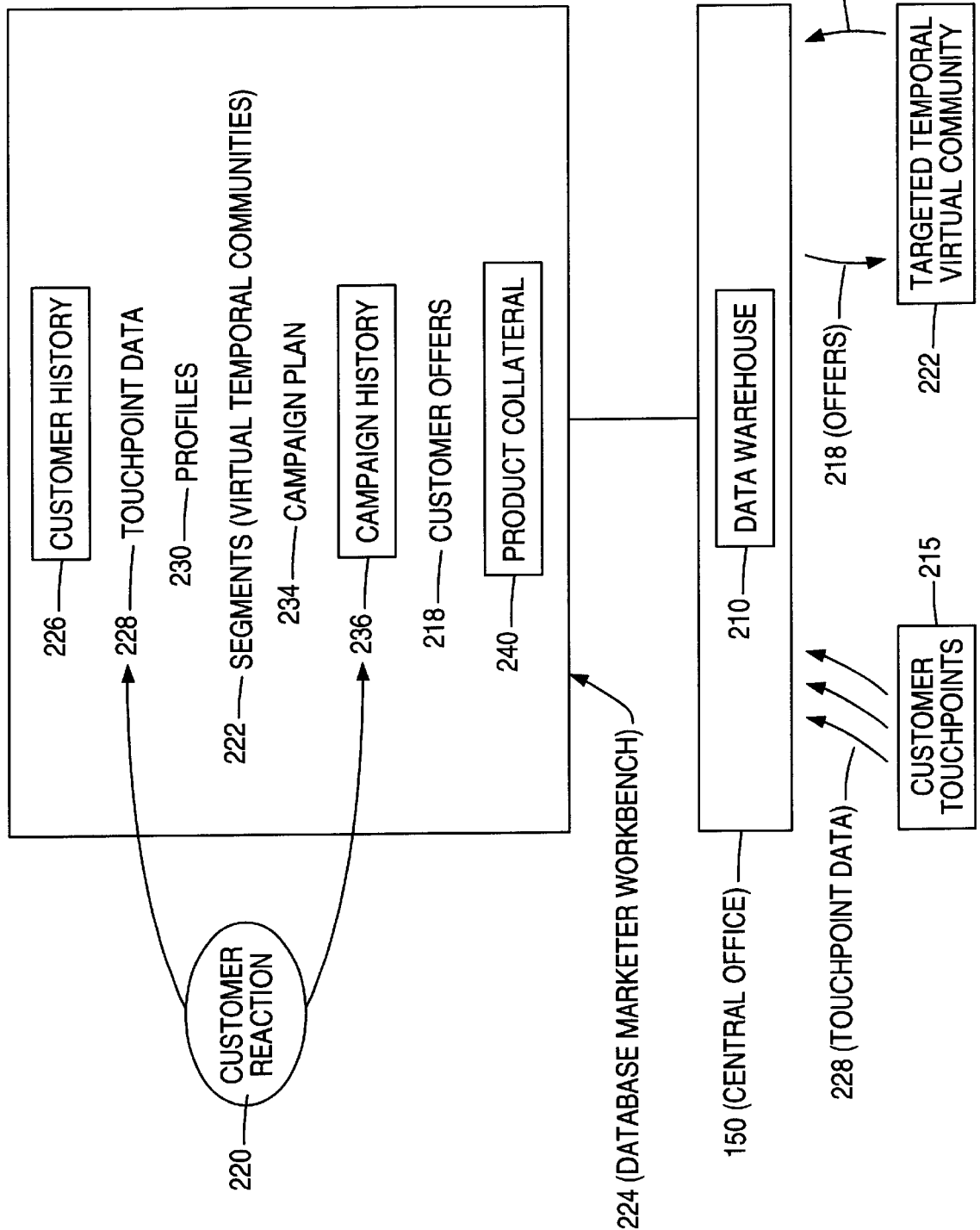
FIG. 2 is a diagram showing the repository of information kept in a data warehouse.

FIG. 2 shows the back office repository of information that is kept in a data warehouse 210 at the central office 150. The data warehouse 210 interfaces with customer touchpoints 215. The data warehouse also keeps information on advertising offers 218 made to a targeted temporal virtual community 222 and reactions 220 to the offer 218 made by the targeted temporal virtual community 222.

Referring to FIG. 2, the data warehouse 210 stores the database marketer workbench 224. This information aids the analyst to determine which advertising offers to make to a virtual community.

The database marketer workbench 224 may contain three types of information, customer history 226, campaign history 236 and product collateral 240. The customer history 226 is made up of touchpoint data 228, customer profiles 230, customer segments (virtual temporal communities) 222 and a campaign plan 234. The campaign history 236 is made up of customer offers 218. Customer reaction data 220 alters the touchpoint data 228 and the campaign history 236.

B. Analyzing Temporal Transaction Example

Figure 3:
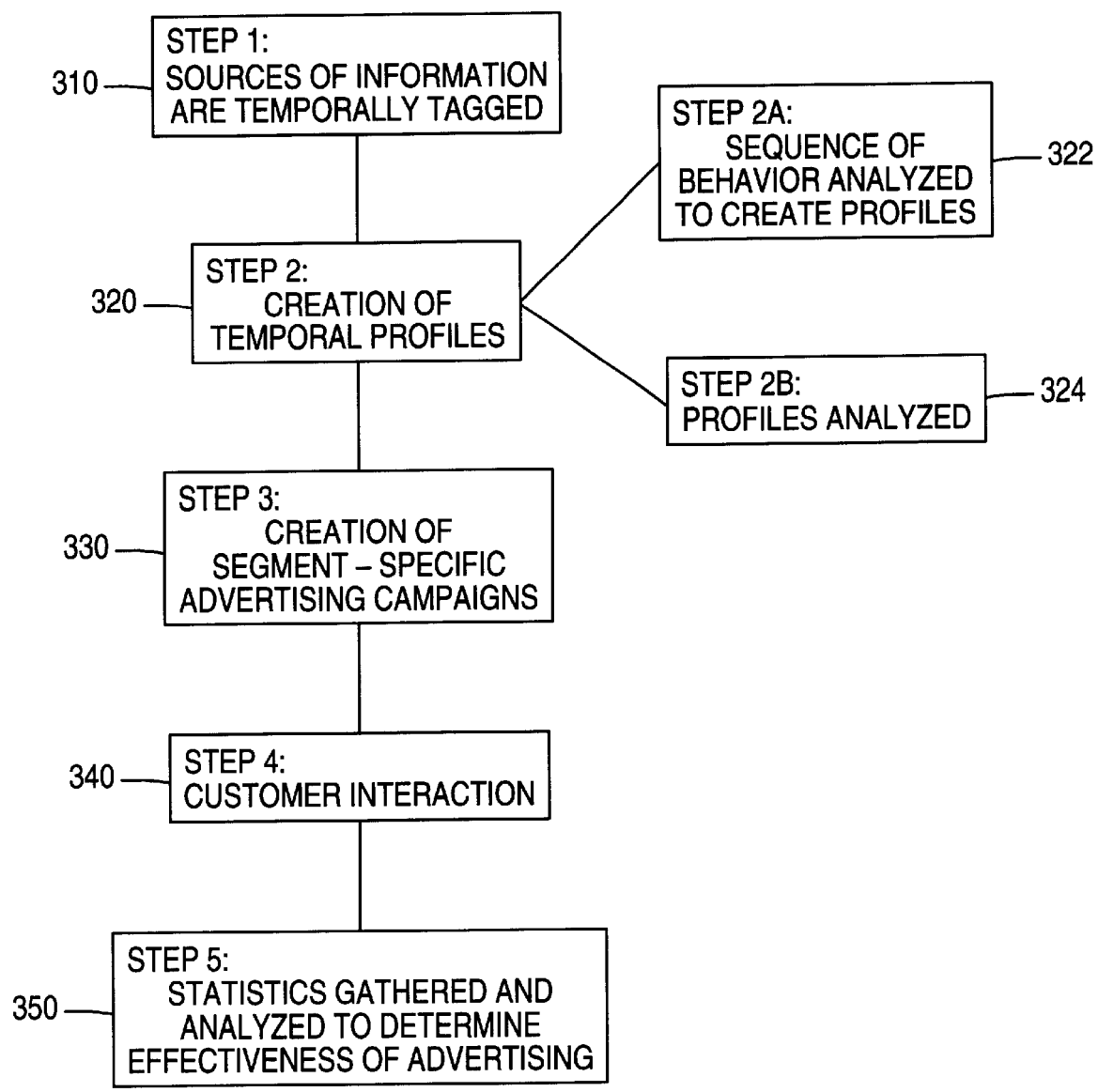
FIG. 3 is a flowchart depicting the overall process of the invention.

Referring to FIG. 3, in the preferred embodiment the overall invention comprises five steps. In step 310, sources of information are temporally tagged. In step 320, temporal profiles are created using the information gathered in the previous step. Step 320 is further broken down into step 322 where the sequence of behavior is analyzed to create profiles and step 324 where the profiles are analyzed to create temporal profiles. In step 330, segment-specific advertising campaigns are created. In step 340, a customer interacts through one of the channels of trade. In step 350, statistics are gathered and analyzed to determine the effectiveness of the advertising campaign.

To better illustrate the overall invention, an example is presented with a customer Willard and his transactions at the Western Store. Assume the Western Store has a web site (e.g., a web site on a web server connected via the Internet 145) as well as a physical store and a call center. There are three channels for Willard's shopping. In step 310, a report of Willard's browsing or shopping behavior gathered from all three channels is assembled. Note that daily interactions through the three channels may be grouped into weekly, monthly, or annual profiles.

A sample temporal browsing or buying behavior report for Willard for a two-day period may be as follows and contain the following records, shown below in Table 1:

TABLE 1

Temporally tagged data for Willard
for time interval 6/9/97 through 6/10/97

| DATE | TIME | CHANNEL | MARKET BASKET PRODUCT ID | MODE |
| --- | --- | --- | --- | --- |
| 6/9/97 | 05:00 | Web Browser Home | Sports Equipment | Browsed |

TABLE 1-continued

Temporally tagged data for Willard
for time interval 6/9/97 through 6/10/97

| DATE | TIME | CHANNEL | MARKET BASKET PRODUCT ID | MODE |
|---|---|---|---|---|
| 6/9/97 | 05:21 | Web Browser Home | 21, 22, 59 Baby Attire 78, 99, 102 | Browsed |
| 6/9/97 | 05:25 | Web Browser Home | Baby Attire 78 | Bought |
| 6/9/97 | 12:15 | Web Browser Work | Sports Equipment 21 | Browsed |
| 6/9/97 | 18:10 | Store #459 | Groceries 29 | Bought with coupon |
| 6/9/97 | 18:10 | Store #459 | Groceries 45, 46, 501, 589, 590, 911, 1000 | Bought |
| 6/9/97 | 18:15 | Store #459 | Sports Equipment 21 | Bought |
| 6/9/97 | 22:10 | Web Browser | Sports Equipment 22 | Browsed |
| 6/9/97 | 22:12 | Call Center Call | Sports Equipment 22 | Asked about larger sizes; gift for father |
| 6/10/97 | 05:27 | Web Browser - Home | Baby Attire 80 | Bought |

The time of day or time of year when these behaviors occur is of interest. In Table 1, the infant shopping occurs only in the morning whereas the sporting goods behavior occurs at two intervals during the day. The present invention can note these trends and use them to infer Willard's future behavior. The present invention performs this by capturing Willard's interactions with each endpoint. In Willard's example, the Web browser notes that Willard entered the sporting goods department at 5:00 a.m., and records what products he browsed. The browser also notes the amount of time he spent in the sporting goods department. Willard then enters the baby attire department, so again the browser notes this fact as well as the time and the products that were browsed and bought. When Willard visits a physical store, the in-store scanners feed the in-store central processor which sends the time of purchase as well as the list of groceries and sporting goods that were bought to the database system. The call center software similarly detects the time of a call to the call center, and the call center agent can capture the essence of the conversation on a screen and send that to the database system. At this point, all of the customer endpoints have captured information which is sent to the database system, which can create a display or database records as shown in Table 1.

FIG. 4 shows how customer behavior may be assembled and displayed on a display associated with any of the computers shown in FIG. 1. The customer name may be entered displayed and is shown at 410. The customer identification may be entered and displayed and is shown at 420. The time interval for the customer 410 is set at 430 and 440. The system responds by presenting all of the customer's behavior during the interval specified. Each behavior is an interaction with the date 460, time of day 470, channel 480, activity 490, type of good 492 and the actual goods browsed or bought 494.

In step 320, the system performs temporal profiling which includes two parts. In the first step, step 322, Willard's sequence of behavior (potentially over a longer period than shown in Table 1) can be analyzed so that his various profiles can be detected. Willard's customer profile is displayed as shown in FIG. 5. Willard's name and customer identification is entered and displayed at 510 and 520. The time interval for his behavior is shown at 530 and 540. The different profiles that Willard fits into are shown at 550, 560 and 570. For example, at 550, Willard is a sports enthusiast that skis and organizes yearly ski trips. For more information on Willard's ski behavior, the user would click any of the underlined words at 550.

In step 324, the profiles gathered at step 322 can be weighed and matched to find other customers who have similar temporal browsing and buying behaviors. Based on the merchandise, it is possible to form some conclusions about Willard from the items Willard buys. For example, from the information in Table 1, Willard is interested in infant toys (perhaps he is a new father) as well as sporting equipment for himself and possibly his father. The present invention would conclude, based on the mix of merchandise and time, that Willard fits into several profiles or clusters. Second, the invention performs a matching/clustering algorithm on Willard's profile to determine if there are other people similar to Willard in their mix of product browsing and buying behaviors. These sets of people with like behaviors are called temporal segments. In this example, suppose the analyst notes a cluster of skiers who browse infantware. The analyst would then create a new virtual community segment called "sports-oriented new fathers". Other segments are also possible.

An example of profile-based segmentation is shown in FIG. 6. Willard's name and customer identification are entered and displayed at 610 and 620. The system responds by presenting profiles of other customers who have similar browsing and purchasing behavior to Willard. These other customers are shown by customer name 630. For each customer shown, there is a score shown at 640 which is the measure of how close the behavior of that particular customer is to Willard's behavior. At 650 and 660 the market basket and channel is shown for behavior that may be characterized as sports enthusiast or new father. At 670 the segment of customer profiles is named "sports-oriented new fathers".

In step 330, the marketing analyst decides what products and offers might be good matches for Willard and like customers in the virtual community of sports-oriented new fathers. In the Willard example, the analyst may decide that a skier's baby carrier might be a good match for this segment, and that a trial offer of 10% off might be used on the web channel the next time that anyone from this segment enters the virtual storefront in the early morning hours. Step 330 may be performed automatically, such as at the central office 150, or manually. The decision by the marketing analyst is entered into the system, and the triggers are set.

Figure 7:
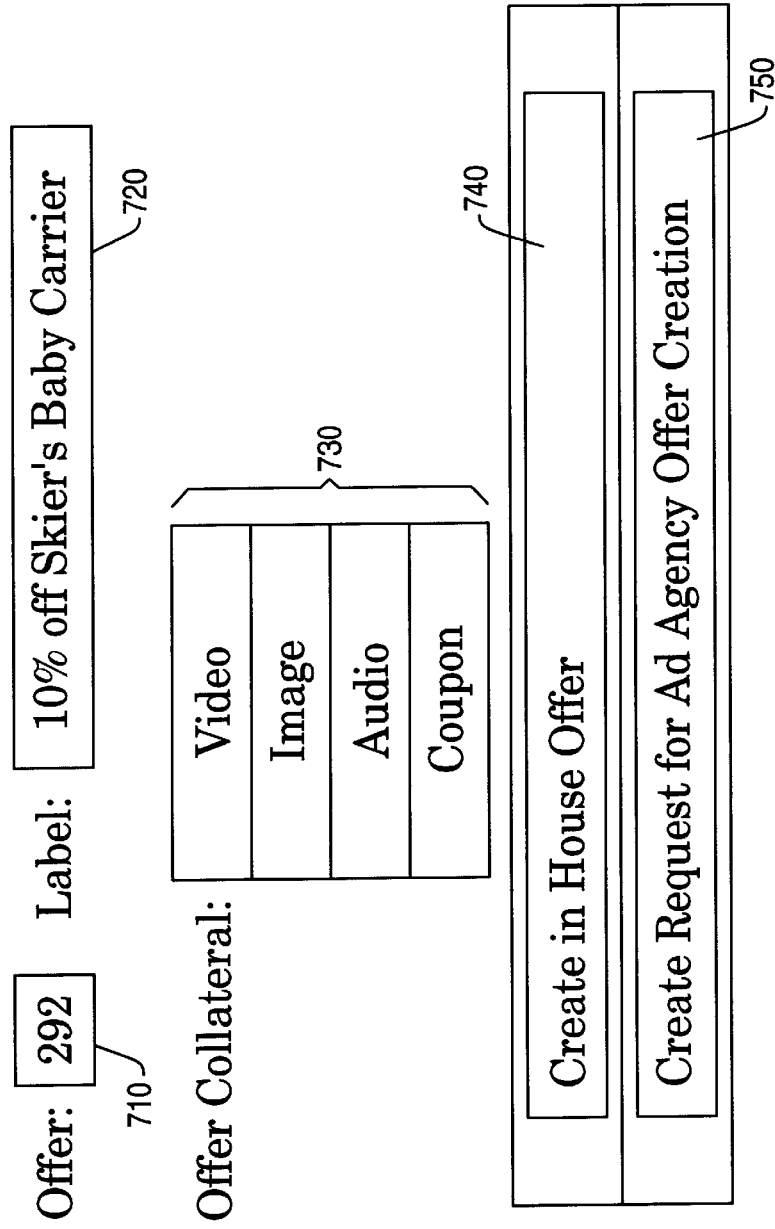
FIG. 7 is a diagram illustrating a sample user interface display of the creation of a custom offer.

FIG. 7 shows an offer created for a temporal profile. The offer identification number is shown at 710. The offer description is shown at 720. How the offer is to be distributed is shown at 730. Whether the offer is to be created in-house or a request is to be made to an ad agency, etc., to create the offer is shown at 740 and 750.

FIG. 8 shows the creation of a campaign aimed at a temporal profile. The campaign identification is shown at 810. The mode that the campaign is to be distributed is shown at 820. The date the campaign is to run is shown at 830 and 840. The region where the campaign is to run is shown at 850.

Figure 9:
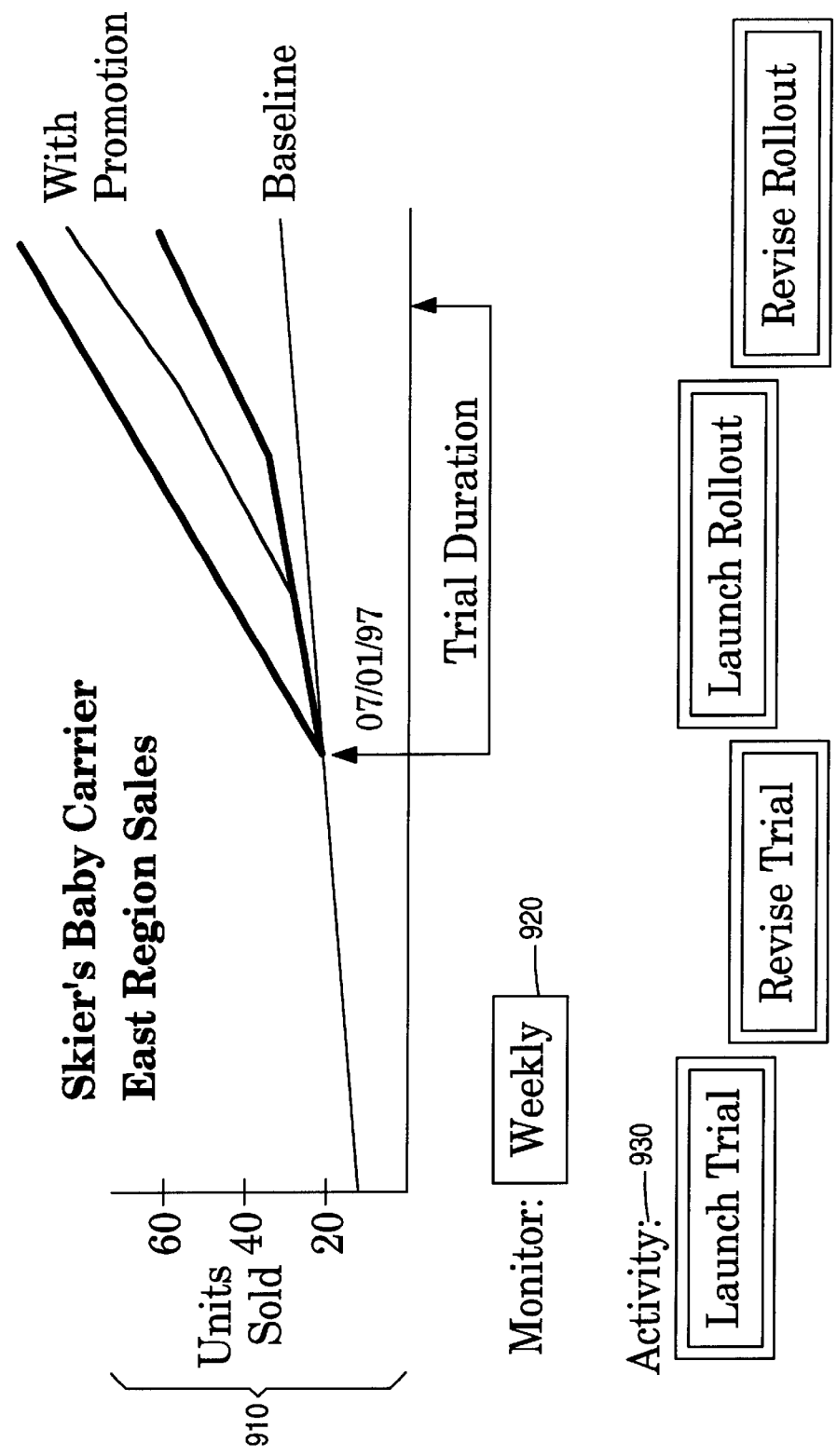
FIG. 9 is a diagram illustrating a sample user interface display of managing a campaign.

A campaign may be monitored and managed as shown in FIG. 9. A graph of the number of units sold with the promotion for the trial duration is shown at 910. The campaign effectiveness is monitored weekly at 920. At 930 the activity to be performed on the campaign is entered.

In step 340, when Willard or anyone else from his temporally defined community enters the web store at the right time, the system dynamically generates an advertisement about the skiers baby carrier that is showed to the customer. If the customer browses this information, or better yet, buys the product advertised, this is viewed as a successful advertising event, and the information about this is captured in the database and linked to the temporal campaign to record the success of the advertising. After several days of advertising, there will be numerous records in the campaign database.

In step 350, the results of the campaign are scored and the results are displayed so the analyst can decide whether the temporal campaign was successful. A sample display of the impact a campaign may have is shown in FIGS. 10 and 11.

In FIG. 10, a campaign effectiveness score may be calculated. The name of the offer may be entered at 1010. The time interval the campaign was run is shown at 1020 and 1030. The segment name and size is shown at 1040 and 1045. At 1050 the number of offer viewings, unique viewings, number of sales per channel and the campaign effectiveness score is shown.

FIG. 11 shows the analysis of a campaign. The campaign is described at 1110 and a graph showing the number of units sold per quarter is shown at 1120.

The example of Willard can be augmented. Additional examples include replenishment shopping or gift shopping. In replenishment shopping, it is determined that every few days Willard probably goes to the store and buys the same rough collection of grocery items. This is called a market basket. The present invention utilizes such tools like NCR's Management Discovery Tool, or Lucent Bell Labs Data Mining Suite to determine the periodicity of particular products in the market basket and uses this for suggestive selling. For example, after a period of data collection and analysis, the invention would reveal that Willard usually comes in after work on Tuesdays to do his weekly shopping. Every Tuesday, Willard picks up bread, milk, Macintosh apples, cereal and his favorite brand of beer. Every third week, he needs toothpaste and about every seventh week, he replenishes toilet paper. In May, he usually buys insect repellent. Using all this information, the system can respond to Willard's login at an online grocery store with a customized home page that contains all of the products for which he is likely to need replenished, given history. For example, if it has been seven weeks since he bought toothpaste, his favorite brand of toothpaste will be suggested on the entry page. In May, for example, insect repellent would appear on the shopping list. The present invention identifies replenishment items by identifying the rates of use of typical pieces of merchandise.

Another category of cyclic behavior is gift buying. There are times of the year when a person buys a gift. Some are holidays such as Christmas, Easter, Halloween, and others are unique for each individual such as birthday or anniversary celebrations. The present invention identifies the gift buying patterns of an individual by identifying trends in the browsing and purchasing behavior. For example, if Willard usually browses for sports equipment and men's clothing, but all of a sudden is interested in women's clothing, this probably indicates he has shifted into a gift-buying role. Discontinuities in normal temporal browsing and buying may be indicators for a life event such as marriage. The present invention utilizes tools such as NCR's Management Discovery Tool and Lucent Bell Labs Data Mining Suite to identify cyclic behavior.

The present invention may use this information for suggestive selling. For example, two weeks before gift-buying behavior begins, the system can download applets that might remind Willard that women's clothing of a certain brand is on sale. If Willard's wife is a store member, her past purchases and browsing behavior may be directly of interest and useful to Willard. His query could be: "find a gift that matches something she has already bought, or that I bought her, within the past year." The system would remind Willard, based on the timing of past purchases, and thereby build customer loyalty.

Although the example used to describe the preferred embodiment of the invention is a retail example, the scope of the invention is not limited to retail. For example, this invention may be used in the financial industry to analyze the browsing behavior of customers looking for a car loan. Such information may be used to generate a customer reminder about a car loan that may be displayed at the wait interval at an ATM machine. Of course, other applications of the present invention may also be made.

What is claimed is:

1. A system for performing targeted advertising based upon a customer's prior transactions and interactions, comprising:

(a) input means for receiving transaction data associated with a retail transaction, wherein the transaction data includes customer information, purchasing information and temporal information associated with the transaction;

(b) means for creating a temporal profile for each customer, based upon the transaction data received by the input means for one or more retail transactions;

(c) means for creating a segment of temporal profiles, each segment having a set of temporal profiles with similar temporal information and similar purchasing information; and (d) means for generating an advertising campaign directed to the segment.

2. The system of claim 1, further comprising:

(e) means for analyzing the advertising campaign to determine its effectiveness.

3. The system of claim 1, wherein the input means comprises a point-of-service terminal.

4. The system of claim 1, wherein the input means comprises a Web server.

5. The system of claim 1, wherein the temporal information comprises the date and time of the retail transaction.

6. The system of claim 1, wherein the temporal profile creating means comprises:

(i) means for analyzing the transaction data to create a transaction profile for each customer; and (ii) means for time-wise analyzing the profile to create a temporal profile for each customer.

7. A process for performing targeted advertising based upon a customer's prior transactions and interactions, comprising the steps of:

(a) receiving transaction data associated with a retail transaction, wherein the transaction data includes customer information, purchasing information and temporal information associated with the transaction;

(b) creating a temporal profile for each customer, based upon the transaction data received by the input means for one or more retail transactions;

(c) creating a segment of temporal profiles, each segment having a set of temporal profiles with similar temporal information and similar purchasing information; and (d) generating an advertising campaign directed to the segment.

8. The process of claim 7, further comprising the step of:

(e) analyzing the advertising campaign to determine its effectiveness.

9. The process of claim 7, wherein step (b) comprises the sub-steps of:

(i) analyzing the transaction data to create a transaction profile for each customer; and (ii) time-wise analyzing the profile to create a temporal profile for each customer.

10. The process of claim 7, wherein the step of receiving transaction data is performed at a point-of-service terminal.

11. The process of claim 7, wherein the step of receiving transaction data is performed at a web server.

12. The process of claim 7, wherein the temporal information comprises the date and time of the retail transaction.

* * * * *